United States Patent
Lagree

(10) Patent No.: US 11,475,789 B2
(45) Date of Patent: *Oct. 18, 2022

(54) INTERACTIVE EXERCISE INSTRUCTION SYSTEM AND METHOD

(71) Applicant: Lagree Technologies, Inc., Chatsworth, CA (US)

(72) Inventor: Sebastien Anthony Louis Lagree, Chatsworth, CA (US)

(73) Assignee: Lagree Technologies, Inc., Chatsworth (CA)

( * ) Notice: Subject to any disclaimer, the term of this patent is extended or adjusted under 35 U.S.C. 154(b) by 110 days.

This patent is subject to a terminal disclaimer.

(21) Appl. No.: 17/208,039

(22) Filed: Mar. 22, 2021

(65) Prior Publication Data

US 2021/0225196 A1 Jul. 22, 2021

Related U.S. Application Data

(63) Continuation of application No. 16/166,425, filed on Oct. 22, 2018, now Pat. No. 10,957,218, which is a continuation of application No. 14/741,735, filed on Jun. 17, 2015, now Pat. No. 10,109,216.

(60) Provisional application No. 62/013,034, filed on Jun. 17, 2014.

(51) Int. Cl.
*G09B 19/00* (2006.01)
*G09B 5/06* (2006.01)

(52) U.S. Cl.
CPC ............. *G09B 19/003* (2013.01); *G09B 5/06* (2013.01); *G09B 19/0038* (2013.01)

(58) Field of Classification Search
CPC .... G09B 5/06; G09B 19/003; G09B 19/0038; A63B 21/00; A63B 22/0076; A63B 22/0087
See application file for complete search history.

(56) References Cited

U.S. PATENT DOCUMENTS

| | | | |
|---|---|---|---|
| 1,621,477 | A | 8/1925 | Pilates |
| 3,770,267 | A | 11/1973 | McCarthy |
| 4,013,068 | A | 3/1977 | Settle |

(Continued)

FOREIGN PATENT DOCUMENTS

| | | |
|---|---|---|
| WO | 2004096376 A1 | 11/2004 |
| WO | 2014084742 A1 | 6/2014 |

OTHER PUBLICATIONS http://www.brainproducts.com/productdetails.php?id=63&tab=1; LiveAmp Overview; Jun. 14, 2016.

(Continued)

*Primary Examiner* — Peter R Egloff
(74) *Attorney, Agent, or Firm* — Neustel Law Offices

(57) ABSTRACT

An interactive exercise instruction system and method for providing interactive multimedia information to an exerciser and for providing the exerciser the ability to provide information back to the system before, during or after exercising. The interactive exercise instruction system and method generally includes receiving a selection of an exercise to perform on an exercise machine, displaying a visual indicator on the exercise surface indicating where on the exercise surface the exerciser is to make contact to perform the selected exercise, determining whether the contact area corresponds to a location of the visual indicator on the exercise surface and determining as to whether or not the exerciser is properly positioned to perform the exercise as signaled.

20 Claims, 6 Drawing Sheets

(56) References Cited

U.S. PATENT DOCUMENTS

| | | |
|---|---|---|
| 4,759,540 A | 7/1988 | Yu |
| 4,798,378 A | 1/1989 | Jones |
| 5,066,005 A | 11/1991 | Luecke |
| 5,201,694 A | 4/1993 | Zappel |
| 5,263,913 A | 11/1993 | Boren |
| 5,365,934 A | 11/1994 | Leon |
| D362,700 S | 9/1995 | Breibart |
| D382,319 S | 8/1997 | Gerschefske |
| 5,681,249 A | 10/1997 | Endelman |
| 5,738,104 A | 4/1998 | Lo |
| 5,812,978 A | 9/1998 | Nolan |
| 5,885,197 A | 3/1999 | Barton |
| 5,967,955 A | 10/1999 | Westfall |
| 6,152,856 A | 11/2000 | Studor |
| 6,179,753 B1 | 1/2001 | Barker |
| 7,108,635 B2 | 9/2006 | Howlett-Campanella |
| 7,163,500 B2 | 1/2007 | Endelman |
| 7,192,387 B2 | 3/2007 | Mendel |
| 7,448,986 B1 | 11/2008 | Porth |
| 7,537,554 B2 | 5/2009 | Zhuang |
| 7,803,095 B1 | 9/2010 | Lagree |
| 7,914,420 B2 | 3/2011 | Daly |
| 7,931,570 B2 | 4/2011 | Hoffman |
| 7,967,728 B2 | 6/2011 | Zavadsky |
| 8,249,714 B1 | 8/2012 | Hartman |
| 8,287,434 B2 | 10/2012 | Zavadsky |
| 8,303,470 B2 | 11/2012 | Stewart |
| 8,585,554 B2 | 11/2013 | Shavit |
| 8,641,585 B2 | 2/2014 | Lagree |
| 8,812,075 B2 | 8/2014 | Nguyen |
| 8,852,062 B2 | 10/2014 | Dorsay |
| 8,911,328 B2 | 12/2014 | Alessandri |
| 9,011,291 B2 | 4/2015 | Birrell |
| 9,199,123 B2 | 12/2015 | Solow |
| 10,046,193 B1 | 8/2018 | Aronson |
| 2001/0056011 A1 | 12/2001 | Endelman |
| 2002/0137607 A1 | 9/2002 | Endelman |
| 2003/0119635 A1 | 6/2003 | Arbuckle |
| 2005/0130810 A1 | 6/2005 | Sands |
| 2005/0164856 A1 | 7/2005 | Parmater |
| 2006/0046914 A1 | 3/2006 | Endelman |
| 2006/0183606 A1 | 8/2006 | Parmater |
| 2006/0199712 A1 | 9/2006 | Barnard |
| 2007/0202992 A1 | 8/2007 | Grasshoff |
| 2007/0224582 A1 | 9/2007 | Hayashino |
| 2007/0270293 A1 | 11/2007 | Zhuang |
| 2008/0051256 A1 | 2/2008 | Ashby |
| 2008/0058174 A1 | 3/2008 | Bernard |
| 2008/0070765 A1 | 3/2008 | Brown |
| 2008/0139975 A1 | 6/2008 | Einav |
| 2008/0242519 A1 | 10/2008 | Parmater |
| 2008/0248935 A1 | 10/2008 | Solow |
| 2009/0005698 A1 | 1/2009 | Lin |
| 2009/0291805 A1 | 11/2009 | Blum |
| 2009/0312152 A1 | 12/2009 | Kord |
| 2010/0125026 A1 | 5/2010 | Zavadsky |
| 2010/0227748 A1 | 9/2010 | Campanaro |
| 2010/0267524 A1 | 10/2010 | Stewart |
| 2011/0018233 A1 | 1/2011 | Senner |
| 2011/0077127 A1 | 3/2011 | Ishii |
| 2011/0143898 A1 | 6/2011 | Trees |
| 2011/0152045 A1 | 6/2011 | Horne |
| 2011/0166002 A1 | 7/2011 | Savsek |
| 2011/0172069 A1 | 7/2011 | Gerschefske |
| 2011/0184559 A1 | 7/2011 | Benabid |
| 2012/0015334 A1 | 1/2012 | Hamilton |
| 2012/0088634 A1 | 4/2012 | Heidecke |
| 2012/0143020 A1 | 6/2012 | Bordoley |
| 2012/0202656 A1 | 6/2012 | Dorsay |
| 2012/0190505 A1 | 7/2012 | Shavit |
| 2012/0228385 A1 | 9/2012 | DeLuca |
| 2012/0295771 A1 | 11/2012 | Lagree |
| 2013/0072353 A1 | 3/2013 | Alessandri |
| 2013/0196835 A1 | 8/2013 | Solow |
| 2013/0210578 A1 | 8/2013 | Birrell |
| 2013/0289889 A1 | 10/2013 | Yuen |
| 2014/0011645 A1 | 1/2014 | Johnson |
| 2014/0066257 A1 | 3/2014 | Shavit |
| 2014/0100089 A1 | 4/2014 | Kermath |
| 2014/0121076 A1 | 5/2014 | Lagree |
| 2014/0121078 A1 | 5/2014 | Lagree |
| 2014/0121079 A1 | 5/2014 | Lagree |
| 2014/0141948 A1 | 5/2014 | Aronson |
| 2014/0148715 A1 | 5/2014 | Alexander |
| 2014/0213415 A1 | 7/2014 | Parker |
| 2015/0012111 A1 | 1/2015 | Contreras-Vidal |
| 2015/0024914 A1 | 1/2015 | Lagree |
| 2015/0057127 A1 | 2/2015 | Lagree |
| 2015/0065318 A1 | 3/2015 | Lagree |
| 2015/0072841 A1 | 3/2015 | Lagree |
| 2015/0105223 A1 | 4/2015 | Bissu |
| 2015/0141204 A1 | 5/2015 | Lagree |
| 2015/0220523 A1 | 8/2015 | Lagree |
| 2015/0246263 A1 | 9/2015 | Campanaro |
| 2015/0343250 A1 | 12/2015 | Lagree |
| 2015/0360083 A1 | 12/2015 | Lagree |
| 2015/0360113 A1 | 12/2015 | Lagree |
| 2015/0364059 A1 | 12/2015 | Marks |
| 2016/0271452 A1 | 9/2016 | Lagree |

OTHER PUBLICATIONS http://www.cognionics.com/index.php/products/hd-eeg-systems/72-channel-system; Cognionics HD-72 Overview; Jun. 14, 2016.

http://www.cognionics.com/index.php/products/hd-eeg-systems/quick-20-dry-headset; Cognionics Quick-20 Dry EEG Headset; Jun. 14, 2016.

http://www.cognionics.com/index.php/products/mini-systems/multi-position-dry-headband; Cognionics Multi-Position Dry EEG Headband; Jun. 14, 2016.

http://www.cognionics.com/index.php/products/mini-systems/dry-eeg-headband; Cognionics Dry EEG Headband; Jun. 14, 2016.

http://www.cognionics.com/index.php/products/hd-eeg-systems/mobile-eeg-cap; Cognionics Mobile-72 Wireless EEG System; Jun. 14, 2016.

PCT International Search and Opinion from International Searching Authority for PCT/US2017/041638; dated Sep. 28, 2017.

PCT Preliminary Report on Patentability from International Searching Authority for PCT/US2016/022888; dated Sep. 28, 2017.

PCT International Search and Opinion from International Searching Authority for PCT/US2016/022888; dated Jul. 25, 2016.

http://www.puzzlebox.io/brainstorms/; Puzzlebox Brainstorms Website Article; Jun. 13, 2016.

INTERACTIVE EXERCISE INSTRUCTION SYSTEM AND METHOD

CROSS REFERENCE TO RELATED APPLICATIONS

The present application is a continuation of U.S. application Ser. No. 16/166,425 filed on Oct. 22, 2018 which issues as U.S. Pat. No. 10,957,218 on Mar. 23, 2021 (Docket No. LAGR-179), which is a continuation of U.S. application Ser. No. 14/741,735 filed on Jun. 17, 2015 now issued as U.S. Pat. No. 10,109,216, which claims priority to U.S. Provisional Application No. 62/013,034 filed Jun. 17, 2014. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND OF THE INVENTION

Field of the Invention

The present invention relates generally to an exercise system and more specifically it relates to an interactive exercise instruction system and method for providing interactive multimedia information to an exerciser and for providing the exerciser the ability to provide information back to the system before, during or after exercising.

Description of the Related Art

Any discussion of the related art throughout the specification should in no way be considered as an admission that such related art is widely known or forms part of common general knowledge in the field.

Conventional Pilates apparatuses are well known throughout the fitness industry, and are generally comprised of a rectangular frame supported on the floor at various points of contact about the rectangular frame. A Pilates apparatus is generally adjustable in a variety of ways with regard to both the size (e.g., height) of the exerciser, as well as the particular exercise being performed.

This adjustability of the Pilates apparatus may be of benefit so as to accommodate exercisers of varying sizes and with varying exercise targets. However, this same adjustability may become a detriment to new users of the Pilates apparatus or when the Pilates apparatus is used in a class taught by a Pilates instructor. In such situations, a Pilates instructor needs to make sure each exerciser's machine is set up properly and that they are performing each exercise correctly. This may become a burden on the instructor, especially as the class size grows.

Further, each exerciser may need to monitor not only their form without specific guidance from the instructor (who may be busy assisting other exercisers), but also monitor their speed and intensity of workout. This self-monitoring, if done improperly, can cause injury or the exerciser to experience lesser results compared to that which they may have achieved in the same or even less time were the exercises performed properly.

Because of the inherent problems with the related art, there is a need for a new and improved interactive exercise instruction system and method for providing interactive multimedia information to an exerciser and for providing the exerciser the ability to provide information back to the system before, during or after exercising.

BRIEF SUMMARY OF THE INVENTION

Provided herein is an exercise system which includes receiving a selection of an exercise to perform on an exercise machine, displaying a visual indicator on the exercise surface indicating where on the exercise surface the exerciser is to make contact to perform the selected exercise, determining whether the contact area corresponds to a location of the visual indicator on the exercise surface and determining as to whether or not the exerciser is properly positioned to perform the exercise as signaled.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Non-limiting and non-exhaustive embodiments are described with reference to the following figures, wherein like reference numerals refer to like parts throughout the various views unless otherwise specified. It should be realized that the drawings are for illustrative purposes only, and drawings should be broadly interpreted, recognizing the many methods and devices of inputting data for display or playback on video screens or speakers. The accompanying drawings are incorporated herein and form part of the specification.

DETAILED DESCRIPTION OF THE INVENTION

Figure 1:
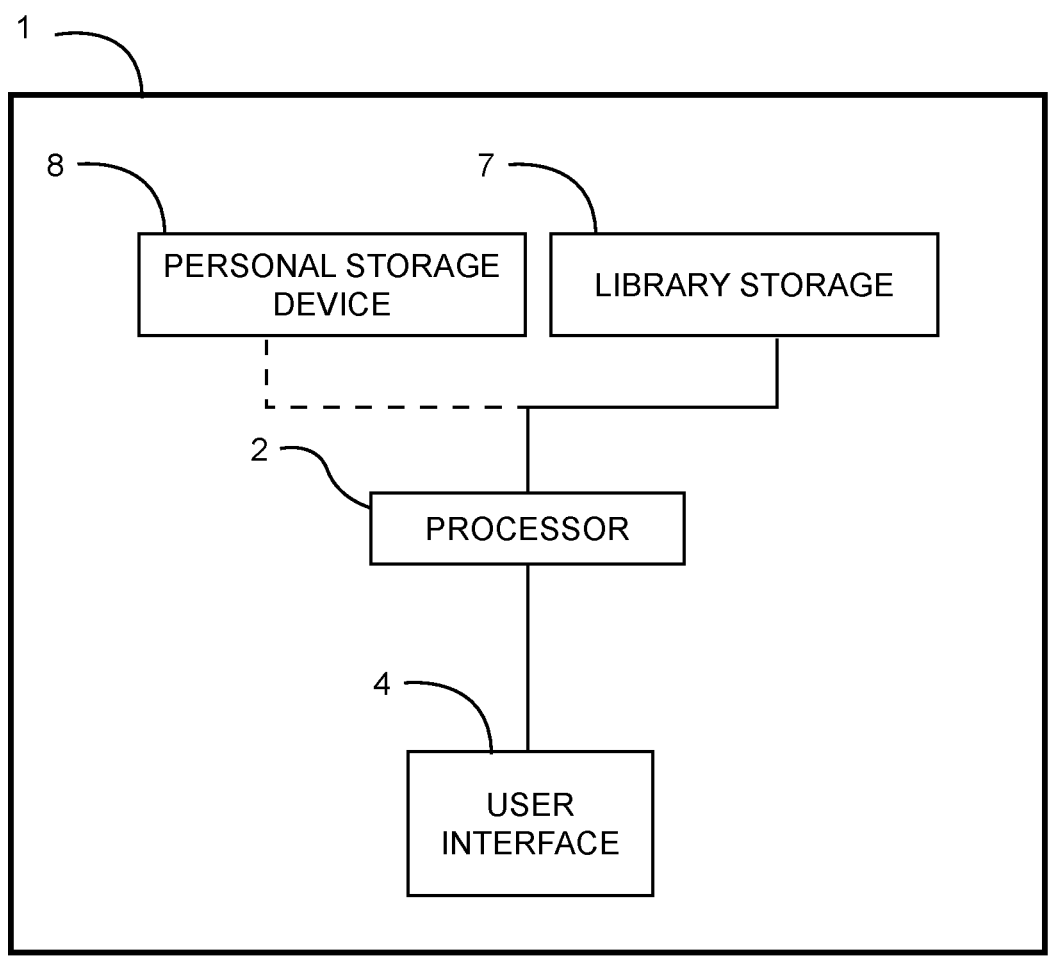
FIG. 1 is a block diagram of a Pilates apparatus used as an exercise machine, according to an embodiment.

FIG. 1 is a block diagram of an exercise apparatus 1 (e.g. a Pilates apparatus), according to an embodiment. The exercise apparatus 1 may be comprised of various types of exercise machines such as, but not limited to, Pilates machines, rowing machines, weight lifting machines, and the like. The exercise apparatus 1 may be comprised of the exercise machine described and shown in U.S. Pat. No. 8,641,585, issued on Feb. 4, 2014 to Sebastien Lagree and U.S. Pat. No. 7,803,095 to Sebastien Lagree, which are hereby fully incorporated herein by reference.

A Pilates apparatus is an adjustable exercise machine that can be adjusted to suit people of varying ages, sizes and fitness goals. The apparatus may often be found in a gym or in a Pilates studio that is used for conducting a Pilates class for a group of exercisers each on their own apparatus. The Pilates apparatus (including its resistances, positions and accessories) may be individually adjusted by each exerciser to accommodate their personal needs or to conform to whatever exercise is being performed in the class.

However, one drawback of this adjustability of a conventional Pilates apparatus is that it takes a long time to learn or to have an instructor individually instruct the exercisers in a class as to proper set up and/or performance of an exercise. For example, a Pilates instructor may need to individually instruct students on the proper positioning of their bodies upon the apparatus, the proper settings for resistance springs, the proper adjustment positioning of attached accessories, and instruction on the proper method of performing an exercise. The loss of actual workout time can result in lower revenue for the gym or class, and penalizes the exercisers in the class by reducing the actual workout time available to the class. This problem may be further exacerbated if different exercises are performed that require additional adjustments to the apparatus during the class.

Another drawback of conventional Pilates apparatuses is that they are unable to provide feedback to the exerciser during the performance of an exercise. For example, as an exerciser performs multiple repetitions of an exercise (as is typically performed during an exercise session) the apparatus is unable to communicate with the exerciser as to their performance. For example, the apparatus cannot inform the exerciser as to the number of repetitions completed, whether they are performing the exercise properly, or whether they are performing repetitions too slowly, too fast, or timed perfectly.

A conventional Pilates apparatus is also unable to provide visual instruction on how to properly perform the various segments of an exercise, leaving this level of instruction to the instructor. Properly performing each phase of an exercise may require the exerciser to be informed about their posture, how to properly breathe during each phase, what muscles to concentrate on flexing, and how far the exerciser should stretch or flex their body during each segment of the exercise. An individual instructor would find it difficult to closely monitor the performance of an exercise over an entire class, especially as the class size grows. An improperly performed exercise can, however, lead to subpar results or even injury by the exerciser.

In the example of FIG. 1, a Pilates apparatus 1 comprises a processor 2 that facilitates transmission, processing and management of communication with a user interface 4 that may be integrated into one or more exercise surfaces of the apparatus 1. User interface 4 may include any display screen, including a touchscreen or interactive display. In an embodiment, user interface 4 may be a touch screen interactive display that is capable of being activated to sense a contact with an exerciser.

User interface 4 may include any type of display screen capable of receiving user input (via a touch screen or other input device) and/or outputting video and/or audio. For example, input devices by which to receive user or exerciser input (herein "user" and "exerciser" are used interchangeably) may include an analog switch, keyboard, or a touch screen affixed to or otherwise connected to the apparatus 1.

In an embodiment, user interface 4 may include a touch screen integrated into an exercise surface of apparatus 1 that receives input from a user. For example, user interface 4 may display an icon or indicator (e.g., visual indicator) as to where a user is to place their feet or other body part on exercise surface/user interface 4 to perform a selected exercise. A user may then step, kneel, or otherwise make contact with user interface 4. Apparatus 1 may be able to detect a location of the contact area with the user, and how closely the contact area corresponds to the displayed area of contact for performance of the exercise.

User interface 4 may include a display including a digital user interface 4 that receives input from and provides output to a user. For example, user interface 4 may provide menus, buttons, or other display items that may be selected (e.g., via touch or other selection mechanism) to activate various functions. For example, functions include loading or requesting an exercise or sequence of exercises, exercise instructions for set up or performance of an exercise, general information (such as information regarding the operation of apparatus 1 or safety guidelines) from the library 7. In an embodiment, apparatus 1 may communicate with (e.g., provide information to and/or retrieve information from) a user's personal storage device 8 such as a smartphone, USB card, or personal physiological tracking device.

As just referenced, library 7 may be a storage device containing information, such as instructions, videos, audio, or other multimedia for instructing the user how to set up, use, and/or perform one or more exercises on apparatus 1. In an embodiment, the library storage device 7 may be remote from the processor 2 and accessible over one or more networks. The information (instructions, directions, etc.) from library 7 may then be output or displayed on one or more user interfaces 4.

As just referenced, the information of library 7 may provide instructions to an exerciser on how to properly adjust the apparatus 1, including settings to perform one or more exercises. The information may also include instructions on how an exerciser should position themself on apparatus 1 to properly perform an exercise or exercise sequence. For example, user interface 4 may be integrated into an exercise surface of apparatus 1. Then for example, the information from library 7 may indicate a portion of the user interface 4 to illuminate or otherwise upon which to display visual indicators as to how the user is to position him/herself on apparatus 1. In an embodiment, user interface 4 may indicate where the exerciser is to place their hands, feet, knees, or other body part to properly position themselves to perform a selected exercise, whereby the user is to place their body on user interface 4 itself at the indicated location(s).

Before or during an exercise, apparatus 1 may monitor where and when an exerciser makes contact (e.g., with a foot, hand, etc.) with user interface 4. Data relating to the exerciser's actual position may be generated or compared relative to a display area where the user was to make contact with user interface 4 to properly perform the exercise. If the received data indicates that the exerciser has assumed an improper position upon the exercise surface (based on a misalignment or lack of correspondence between the user's contact and the indicated portion of the display), the processor 2 may signal the exerciser their position is improper.

For example, apparatus 1 may provide instructions on how to correct, change, or otherwise modify their position to position themselves properly to perform the exercise. These instructions may include visual, audio, and/or tactile indicators or signals to the exerciser.

In an embodiment, apparatus 1 may determine a new position of the exerciser based on a subsequent contact with user interface 4, for example, during a performance of the exercise. Based on the subsequent contact, processor 2 may determine whether or not the exerciser is now properly positioned to perform the exercise based on the exerciser's new contact area relative to the indicated or displayed (or previously displayed) preferred position area. Apparatus 1 may then inform the user as just described if their subsequent positioning is correct or incorrect.

Real-time instructional information or exercise performance data may be displayed for or otherwise provided to the exerciser before, during, or after the performance of an exercise. In an embodiment, if the exerciser is positioned upon the user interface 4 such that the displayed information is not viewable or otherwise, the user interface 4 is displaying positional information where the exerciser is to make contact with the user interface 4 to perform the exercise, the additional or instructional information may be delivered to an alternate user interface 4 installed on a different surface of apparatus 1 or via another device with a visible screen such as a personal storage device 8 or, for example, audio instructions may be provided.

In an embodiment, apparatus 1 may communicate with or otherwise be communicatively coupled to a personal storage device 8. For example, apparatus 1 and personal storage device 8 may communicate via a direct plug-in or wired connection, wireless connection through the Internet, cellular network, Bluetooth pairing, or other communication links. Personal storage device 8 may be a wearable activity-tracking device that collects or senses physiological or other information regarding an exerciser's activity or performance. In an embodiment, information may be provided from apparatus 1 for display on a screen or user interface of personal storage device 8, or from personal storage device 8 for display on a user interface 4 of apparatus 1. For example, physiological information may be retrieved from device 8 and displayed on user interface 4.

In an embodiment, information (such as instructions from library 7 or personal data) may be displayed via personal storage device 8. For example, a personal storage device 8, such as a smartphone, may include an app or application that communicates with apparatus 1 and can be used to communicate with an exerciser. Through the app or other communicative link, instructional information or other data may be provided to and displayed on personal storage device 8.

Figure 2:
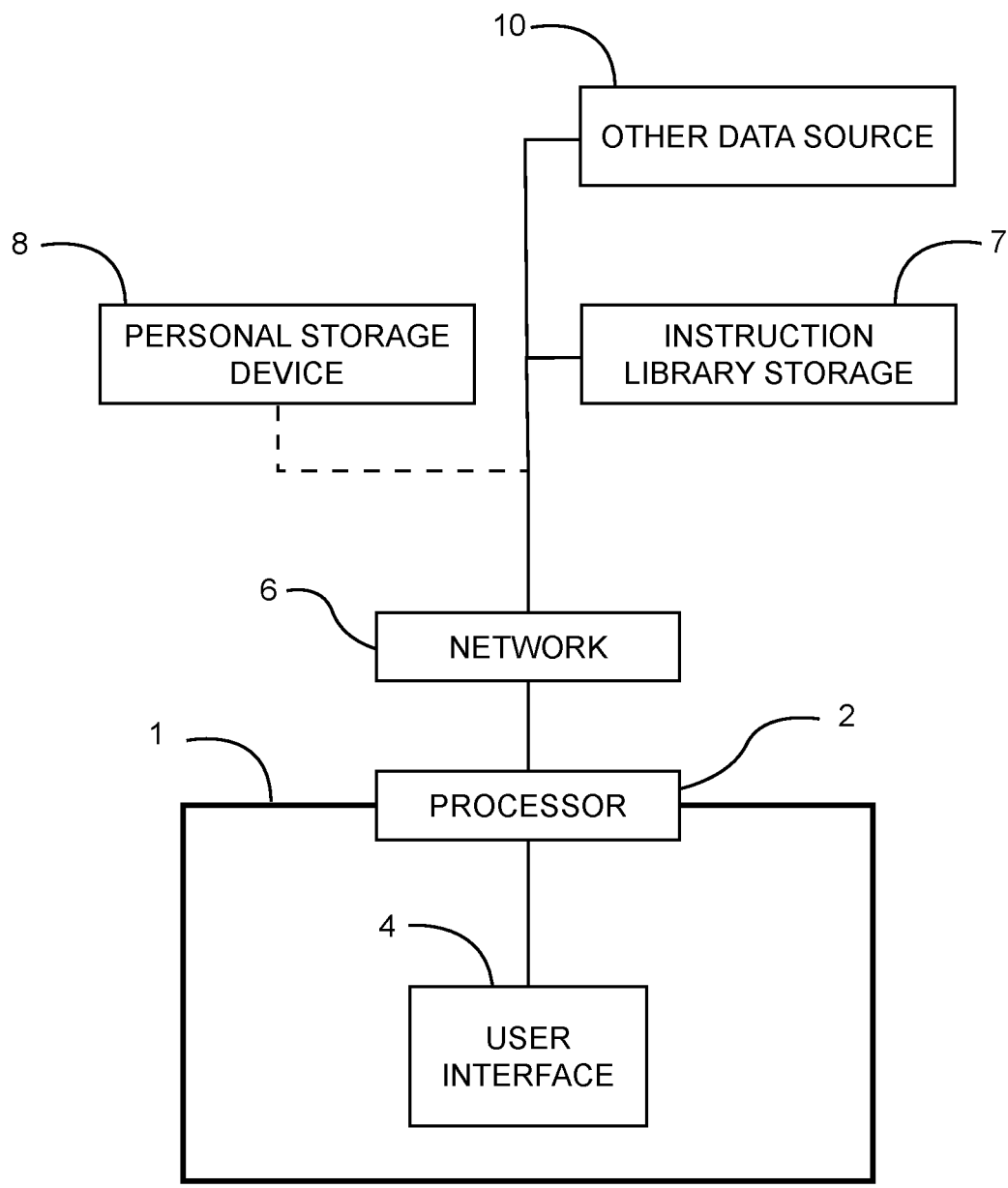
FIG. 2 is a block diagram of a Pilates apparatus configured to communicate over a network, according to an embodiment.

FIG. 2 is a block diagram of a Pilates apparatus 1 configured to communicate over a network 6, according to an embodiment.

Apparatus 1 may include one or more user interfaces 4. In an embodiment, apparatus 1 may include multiple user interfaces 4 of varying types. For example, a first user interface 4 may be a touch screen display, while a second user interface 4 may be a monitor or other video/audio-output device. Processor 2 may provide for communications between apparatus 1 and one or more network devices operating on or otherwise communicating over network 6. An example network device may include, library storage device 7 that may contain information to be displayed on the one or more user interfaces 4 integrated into or otherwise in communication with the apparatus 1.

Network 6 may include any communications link or network. For example, network 6 may include a Bluetooth, LAN, WIFI, cellular network, WAN, or wired communication link between Pilates apparatus 1 and one or more devices (e.g., personal storage device 8, library storage device 7, or other data source 10). Other data source 10 may include or provide content such as a television feed, the Internet, or music that is intended to be displayed upon or otherwise output by one or more user interfaces 4 of apparatus 1. In an embodiment, any of the devices shown to communicate with apparatus 1 over network 6 may communicate directly with or otherwise be integrated with processor 2.

Further, the overall functionality of the interactive exercise apparatus 1 of FIG. 2 may be similar to that described above with respect to FIG. 1. However, FIG. 2 is an example embodiment of the apparatus 1 communicatively coupled to various components (e.g., storage device, other content or data source 10, and personal storage device 8) over a network 6.

Figure 3:
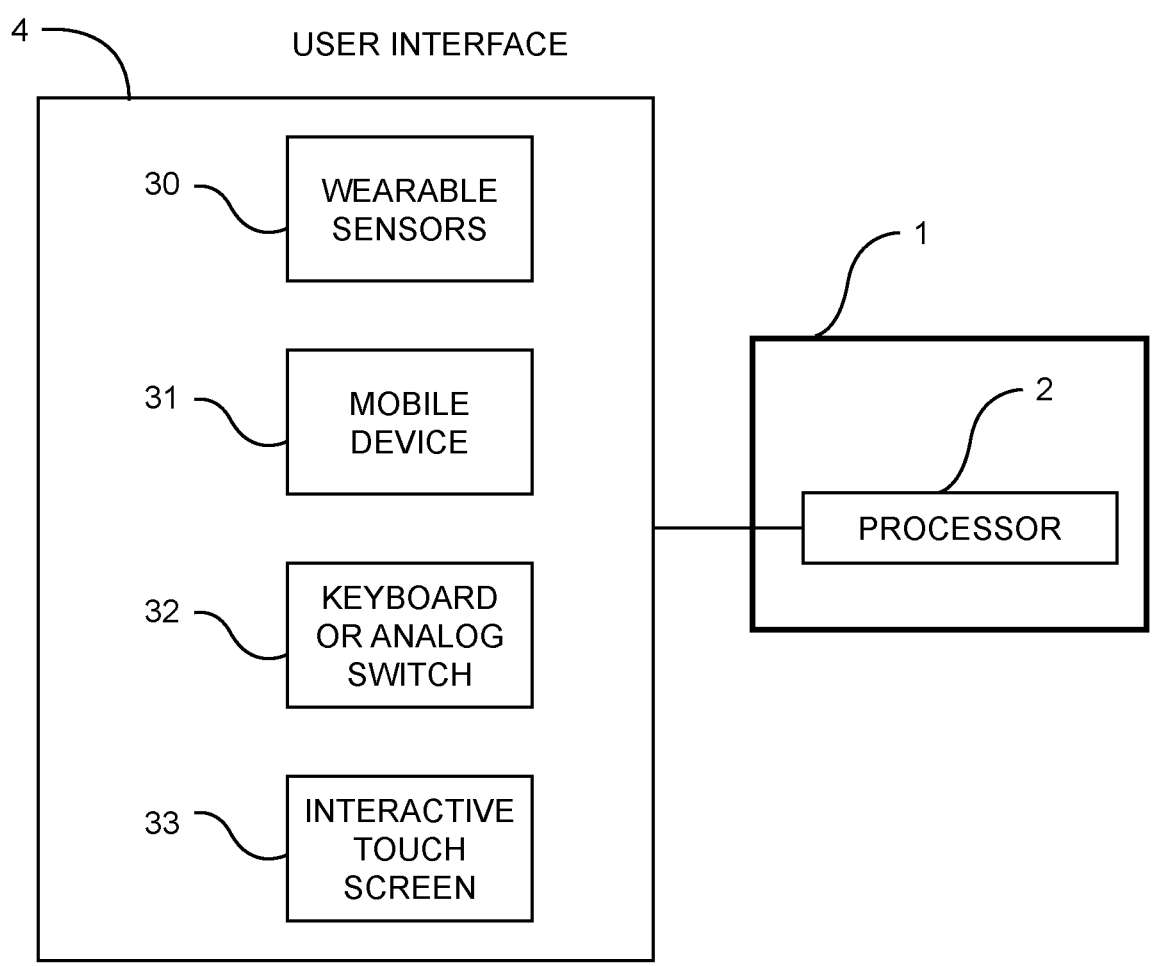
FIG. 3 is a block diagram of exemplary communications between a user interface and a Pilates apparatus.

FIG. 3 is a block diagram of exemplary communications between a user interface 4 and a Pilates apparatus 1.

Pilates apparatus 1 may be similar to the apparatus 1 described above with respect to FIG. 1 and FIG. 2, and may have a processor 2. Processor 2 may communicate with a user via a user interface 4, including both providing information to (visual/audio output) and receiving information from a user. The communications may occur in real-time.

In an embodiment, an exerciser may communicate or otherwise interact with the interactive exercise instruction system (as may be integrated with or operating on processor 2) of Pilates apparatus 1 through one or more user interfaces 4. FIG. 3 shows various examples of user interfaces 4 that may be used to facilitate communication with an exerciser. In varying embodiments, an apparatus 1 may include one or more of the user interfaces 4.

In an embodiment, user interface 4 may include a keyboard or analog switch 32 that may be used to actuate and/or otherwise interact with the system. Actuating the system or apparatus 1 may include the process of turning on or waking up the system for use by an exerciser. A keyboard 32 may comprise a touch screen or an accessible switch affixed to otherwise connected or in communication with the Pilates apparatus 1 and corresponding to a display. In an embodiment, keyboard 32 may include a standard or specialized keyboard with a wired/wireless connection to apparatus 1.

In an embodiment, a user or exerciser may use a mobile device 31 to communicate with apparatus 1. For example, mobile device 31 may have an installed application (e.g., app) that communicates with a program or system operating on processor 2 of apparatus 1. Via the installed application or other communication link (such as Bluetooth), the exerciser may remotely communicate with and/or control apparatus 1. For example, an exerciser using a specially designed app installed on their mobile device 31 may control or communicate with the Pilates apparatus 1 as described herein, including selecting which exercise to perform. In an embodiment, an exerciser may actuate the interactive exercise instruction system of apparatus 1 from their mobile device 31.

Once actuated, the interactive exercise system of the Pilates apparatus 1 may function as a virtual instructor or coach. As described above, apparatus 1 may visually and/or audibly provide instructions to properly set up the Pilates apparatus 1 to perform a Pilates exercise via one or more of the user interfaces 4. As such, use of the interactive exercise system of the Pilates apparatus 1 may minimize injury resulting from exercising on an improperly set-up apparatus. In an embodiment, apparatus 1 may alert an exerciser if it senses (via one or more of the user interfaces 4) that a user is not properly performing or properly positioned to perform an exercise, and as such may prevent injury that may occur from the improper performance of an exercise.

As referenced above, in an embodiment, user interface 4 may be an interactive touch screen 33. Interactive touch screen 33 may include one or more interactive touch screens 33 of Pilates apparatus 1. User interface 4 (including interactive touch screen 33) may display instructions for exercisers as to on what body part to place on the exercise surface of Pilates apparatus 1 and where to place that body part. For example, an interactive display or touch screen 33 may be integrated with or otherwise connected to the exercise surface of a slidable carriage (or other surface) of Pilates apparatus 1. The display may provide text or other visual/audible instructions as to where the exerciser should position their hands, feet, knees, or other body part upon the carriage, and further illuminate the proper location for respective body part. For example, the touch screen 33 may provide an indicator or image of where to place the left and/or right foot.

An exerciser, receiving the instructions, may step on or otherwise position themselves on apparatus 1 (e.g., on user interface 4 integrated into an exercise surface of apparatus 1) as instructed. User interface 4 may be activated, now acting as a touch screen 33, may sense the location of the exerciser's feet or other body part on the exercise surface/user interface 4. The user interface 4 or processor 2 may analyze the contact location (e.g., where the exerciser placed his/her feet on user interface 4) relative to the instructed or displayed location(s). Apparatus 1 may then determine that the user is properly positioned (e.g., if the user has placed their feet in the proper location(s)) or improperly positioned (e.g., if the user has not placed one or more feet in the proper location(s)) to perform a selected exercise.

In an embodiment, apparatus 1 (e.g., via user interface 4) may audibly/visually alert the exerciser to relocate their feet to the proper location to perform a selected exercise. Or, for example, the apparatus 1 may inform the user if their feet are properly positioned on the apparatus 1 and that they may begin the exercise.

In an embodiment, user interface 4 may include or be part of a wearable sensor 30. Wearable sensor 30 may track physical activities, food intake, and physiological functions such as respiration, heart rate and blood pressure of an exerciser. These activities may occur in conjunction with or apart from use of Pilates apparatus 1. For example, processor 2 may receive a beginning (pre-exercise) heartbeat and a post and/or during exercise heartbeat of the user.

In an embodiment, the interactive exercise instruction system of apparatus 1 provides for a real-time user interface 4 or interaction via wearable sensor 30. When attached to the exerciser, in wired or wireless communication with the processor 2, the exerciser's performance data is communicated to one or more of the user interfaces 4 to receive real-time data and/or provide instant performance feedback. In an embodiment, the performance data or feedback may include data regarding the user's physiological status during a performance of an exercise or set of exercises.

Based on standardized performance data previously entered into a database (not shown), the interactive exercise instruction system of apparatus 1 may function as a coach, informing the exerciser of their performance. For example, sensors may determine that the exerciser is performing the exercise repetitions too quickly, and apparatus 1 may signal or send a message for the exerciser to slow down. As just referenced, another example of real-time feedback may be based on heart rate sensor information. For example, processor 2, referencing a standardized heart rate table, may determine that the exerciser is only performing at 65% of their aerobic capacity, and instruct the exerciser to increase exercise intensity by increasing the spring resistance workload or pace.

Via contact between an exerciser and user interface 4 at one or more points of contact, the system of apparatus 1 may continually monitor, instruct, and correct an exerciser in the performance one or more Pilates exercises. This information may be provided both before and/or during the performance of an exercise, and in real-time. The system may eliminate or reduce time instructors spend on one-on-one coaching of students in a Pilates class, reduce injuries related to improper positioning or performance of an exercise, and provide beneficial performance feedback to help exercisers maximize the value of their exercise time.

Figure 4:
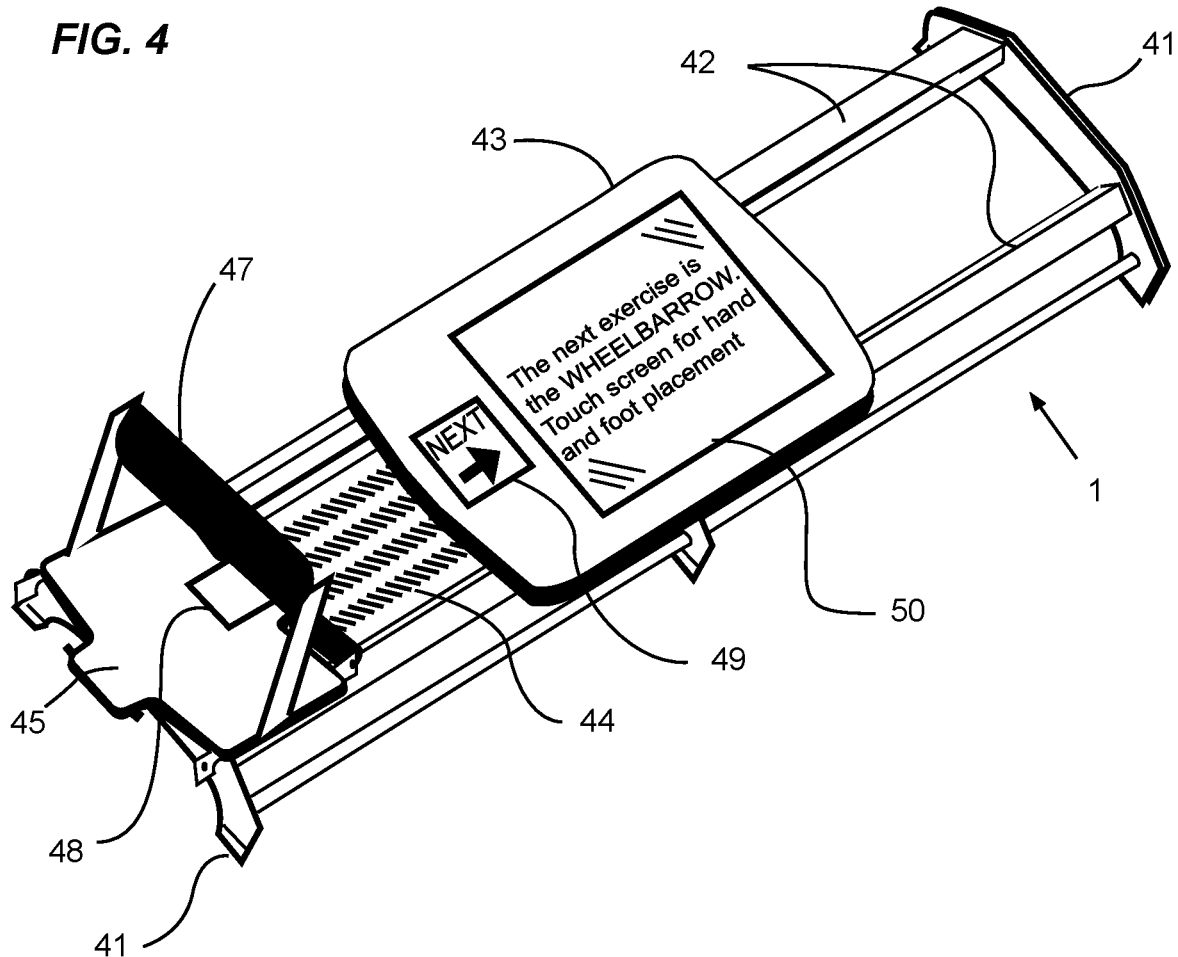
FIG. 4 is an exemplary diagram of a Pilates apparatus with an interactive video display device integrated into an exercise surface.

FIG. 4 is an exemplary diagram of a Pilates apparatus 1 with an interactive video display device 50 integrated into an exercise surface. Display devices 48, 49, and 50 may include functionality similar to that described above with respect to user interface 4, and may include varying embodiments thereof. For example, display 50 may be a touchscreen device, while display 48 is a monitor (video-out) display without touch screen functionality.

Pilates apparatus 1 may have a lower support structure comprising a plurality of supports 41 that support a pair of parallel rails 42 extending substantially the length of the apparatus 1. A slidable carriage 43 may slide along the parallel rails 42 in response to exerciser movements. For example, an exerciser may perform exercises by moving slidable carriage 43 along the rails in a direction distal to the end of the apparatus 1.

A variable resistance force may be generated by attaching or adjusting one or more removable springs 44 between the slidable carriage 43 and a substantially fixed end 45 of the lower structure. An exerciser may work against the resistance of the springs 44 by applying a workload force that exceeds the spring resistance force. The workload force may be applied to the slidable carriage 43, such that the slidable carriage slides along the rails 42 in a direction opposed to the fixed end 45.

For example, an exerciser kneeling on the slidable carriage 43, facing the fixed end 45, may grasp the push handle 47 with two hands, and push against the push handle 47 with sufficient force to overcome the resistance force of the springs 44 thereby sliding the slidable carriage 43 away from the fixed end 45. The exerciser, after extending the push, may reduce pressure on the push handle 47, thereby allowing the springs 44 to pull the slidable carriage 43 back towards the fixed end 45. This back and forth, or complete cycle, may be referred to as "one repetition" of the exercise. Typically, Pilates exercise routines call for the exerciser to complete a fixed number of repetitions, for example, "ten reps", before beginning a new and different exercise.

In the embodiment shown, a video display screen 50 may be integrated into the top exercise surface of the slidable carriage 43. Display screen 50 may be designed to sustain the weight or force applied by a user who is standing, sitting, or otherwise contacting the display screen 50 before, during, and/or after an exercise. The video display screen 50 may be display only or a touch screen that provides for viewing and interaction by an exerciser. In an embodiment, the video display screen 50 may first present to an exerciser text or video instructions relating to general safety considerations prior to exercising or instructions on how to perform the upcoming exercise.

After reviewing the instructions, the exerciser may interact with the video display screen 50 to advance the information to be shown next on the touch display screen, or alternatively, may touch a "next button" on a secondary interactive screen 49 positioned within easy reach in a secondary location on the exercise surface.

Pilates apparatus 1, having a stationary exercise surface affixed to the structure at the fixed end 45, shows one possible location of a third video display screen 48, which may be a video or touch screen as well.

In an embodiment, the video display screens 48, 49, 50 may be flexible, thereby providing comfort and resilience on the top exercise surfaces. For example, the display screens may have the approximate comfort and resilience of the material of the exercise surfaces or a different level. In different embodiments, the size and number of display screens may vary in different embodiments.

Pilates apparatus 1 includes an integrated multimedia input/output device for delivering instruction, information, entertainment, and exercise performance to an exerciser, and receiving manual or automatic input from an exerciser is provided.

As described, Pilates apparatus 1 may include one or more video display screens 48, 49, 50 (which may include interactive video display screens 48, 49, 50 with or without touch-screen user interfaces and audio capabilities). The information provided via the display screens may include, but is not limited to, exercise instruction, information relating to the exerciser's membership at an exercise facility, general exercise information, monitoring and reporting exerciser performance information in real time, and entertainment such as television, radio programming or advertising.

Additional information received from one or more other sources (as described above) may also be displayed on the display screens of apparatus 1. For example, aerobic performance, anaerobic performance, cardiovascular performance including pulse and blood pressure, and performance against maximum thresholds may be provided to an exerciser. Exercisers who are continually informed of their performance levels throughout the exercise will understand whether to "back off" or increase the intensity in order to maximize the physiological benefits of the exercise.

Pilates apparatus 1 may more efficiently deliver exercise instructions to a multitude of participants within a Pilates class, reduce injury through continued monitoring and feedback instruction, reduce the total time required to conduct a class, and thereby increase the number of classes and associated revenue for the Pilates facility. For example, the Pilates apparatus 1 may be synchronized amongst the machines of the class, such that each exerciser is receiving information regarding the same exercise as being performed by the class. As described above, Pilates apparatus 1 may be connected to a network, and may exchange (send and/or receive) information with one or more devices over the network 6.

In an embodiment, Pilates apparatus 1 may access personal data of the exerciser (e.g., from a local or network storage), and display or output video, audio, or text portions of the exerciser's personal data through the video or audio devices incorporated into the apparatus 1, such as display devices 48, 49, 50. This may be performed via network communications. In an embodiment, Pilates apparatus 1 may communicate with a wearable activity or physiological tracking device 30 worn by a user or an interactive mobile application installed on a personal mobile device 31 (or other communication link between mobile device 31 and apparatus 1).

Pilates apparatus 1 provides an interactive display screen (e.g., display 50) integrated into one or more exercise surfaces of the apparatus such that the exerciser's position can be automatically determined by contact with screen 50. The position information may be processed to determine an accuracy or correctness of the exerciser's position on apparatus 1. Additionally, instructions relating to proper repositioning (if needed) alerts the exerciser via a video and/or audio output via apparatus 1 or other personal device of the exerciser, thereby eliminating the requirement for an instructor to individually instruct each exerciser in a multi-exerciser class, and further reducing the potential for injury of an exerciser improperly positioned upon the apparatus 1.

Figure 5:
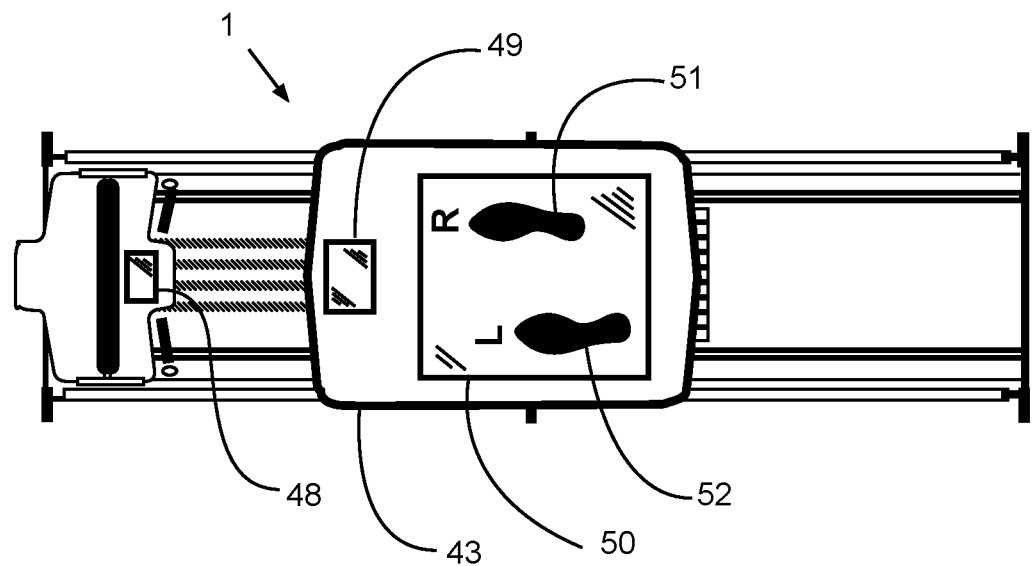
FIG. 5 is an exemplary diagram showing a top view of a Pilates apparatus.

FIG. 5 is an exemplary diagram showing a top view of a Pilates apparatus 1. The example apparatus 1 is a top view of the apparatus 1 of FIG. 4 and includes multiple video displays 48, 49, 50 integrated into various surfaces (including an exercise surface, display 50) of apparatus 1.

In the example embodiment, one video display screen 48 may be integrated into the fixed end of the apparatus 1, and two video display screens 49, 50 may be integrated into the exercise surface of the slidable carriage 43. Other embodiments may include a varying number of displays mounted on varying surfaces of apparatus 1. Before, during and after exercising, certain safety, instructional, or exerciser performance data may be displayed on one or more of the display screens 48, 49, 50. In an embodiment, apparatus 1 may include speakers or audio out capabilities in addition to or in lieu of the display screens 48, 49, 50.

Some of the displayed content may be automatically shown on the display screens 48, 49, 50, some of the information may be displayed responsive to exerciser input or menu selection, and some of the information displayed may be real-time exerciser performance data sent to the apparatus 1 from wearable tracking devices 30. For example, if apparatus 1 receives information indicating the exerciser's heart beat is too fast, apparatus 1 may alert the exerciser to slow down or stop exercising.

In different embodiments, the source from which content or information is received may vary, as may the manner in which instructions are delivered to the user. Further, although displayed content has been described as being visual content, in embodiments, visual content may include visual and audio content, audio only, or other multimedia content. Audio content, such as the audio track of displayed videos, or streaming music for example, may also be delivered to speakers (not shown) integrated into or otherwise associated with apparatus 1. It should be further noted that audio may alternatively be delivered to the exerciser using a wired headset/speakers or wireless (e.g., Bluetooth) connected wireless device with appropriate speakers or personal headset.

In an embodiment, one or more of the display screens 48, 49, 50 may be a touch interface. For example, an image of a right foot 51 and an image of a left foot 52 may be digital representations of proper foot placement for a particular exercise. The representations may be illuminated or otherwise displayed on the interactive display screen 50. An exerciser, preparing to position themselves on the slidable carriage 43 for an exercise to be performed, may then place their left and right foot over the illuminated locations. In an embodiment, apparatus 1 may provide audio content and/or text content in addition to the displayed representations.

Display 50 shows an example of a location where a user is to place their feet to properly position themselves to perform a particular exercise on apparatus 1. Touch screen 50 may sense an exerciser's foot location and send the location information to a processor 2 to determine whether the exerciser is properly positioned on the slidable carriage 43 for the upcoming exercise. If the exerciser is not properly positioned, instructions regarding re-positioning the feet may be delivered back to the exerciser by way of video, audio, or other multimedia. When the exerciser's feet are properly positioned, the user may similarly be alerted. For example, the information displayed may change from positioning information, to instructions on performing the exercise, or another indicator of proper placement may be signaled to the user, such as a green light or audible alert.

Figure 6:
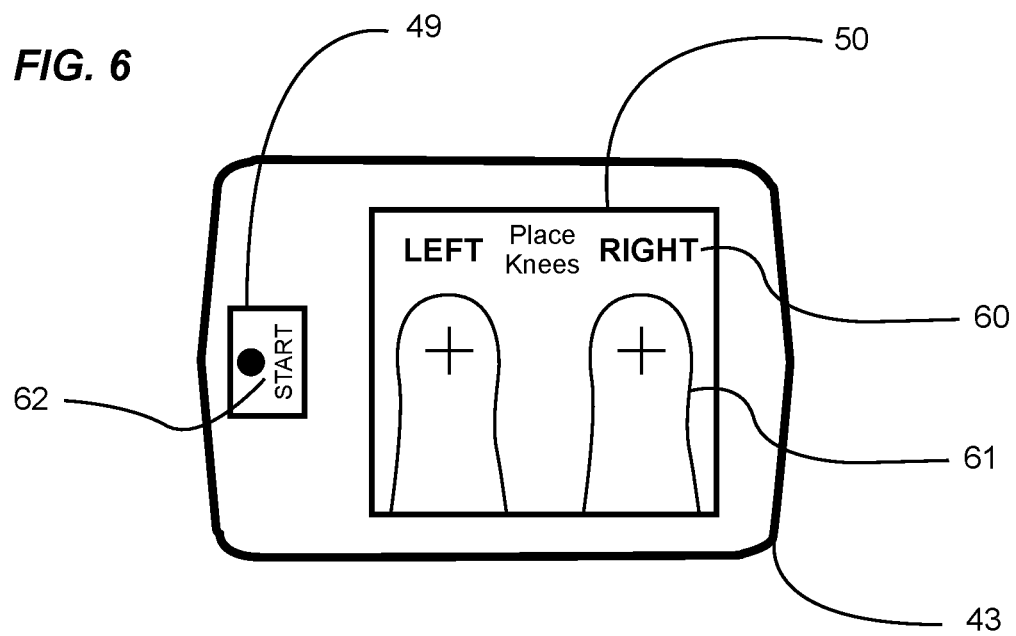
FIG. 6 is an exemplary diagram showing a top view of a slidable carriage of a Pilates apparatus, according to an embodiment.

FIG. 6 is an exemplary diagram showing a top view of a slidable carriage 43 of a Pilates apparatus 1, according to an embodiment. The example apparatus 1 may include one or more video display devices 48, 49, 50 attached to or integrated into the exercise surface.

The display screen 50 shows another example of how an exerciser is to position themselves to perform another exercise on a Pilates apparatus. Screen 50 is mounted on the top of slidable carriage 43 and shows where a user is place their left and right knees and in which direction the user should be faced. For example, the user should be faced to be able to read the text displayed on screen 50. Screen 50 displays a location of where an exerciser's body part(s) is to be placed, which body part is to be placed on exercise surface/screen 50 and in which direction the exerciser should be faced to perform a selected exercise.

The apparatus 1 may process a contact area where a user places their knees relative to the displayed area where the user is to place their knees. If the knees are improperly placed, the text instructions 60, as well as the knee images 61 may change to alert the exerciser of improper positioning. However, if it is determined that the exerciser's knees are properly positioned for the upcoming exercise, the information displayed on a second touch sensitive display screen 49 may change to an illuminated representation of a "start" button 62. The exerciser starts the exercise routine thereafter either by touching the "start" button 62 or beginning to move in performance of the exercise on apparatus 1.

The "start" button 62 may be displayed on any one or more of a plurality of interactive display screens 49 or alternatively, the exercise routine may automatically start without exerciser input other than the touch sensitive display screen 50 and processor 2 sensing that the exerciser's knees are properly positioned for the exercise. In an embodiment, the exerciser may be provided an visual and/or audible alert indicating whether or not they are properly positioned before the exercise begins, and/or may be provided a subsequent alert if they deviate from the proper position during a performance of the exercise.

Figure 7A:
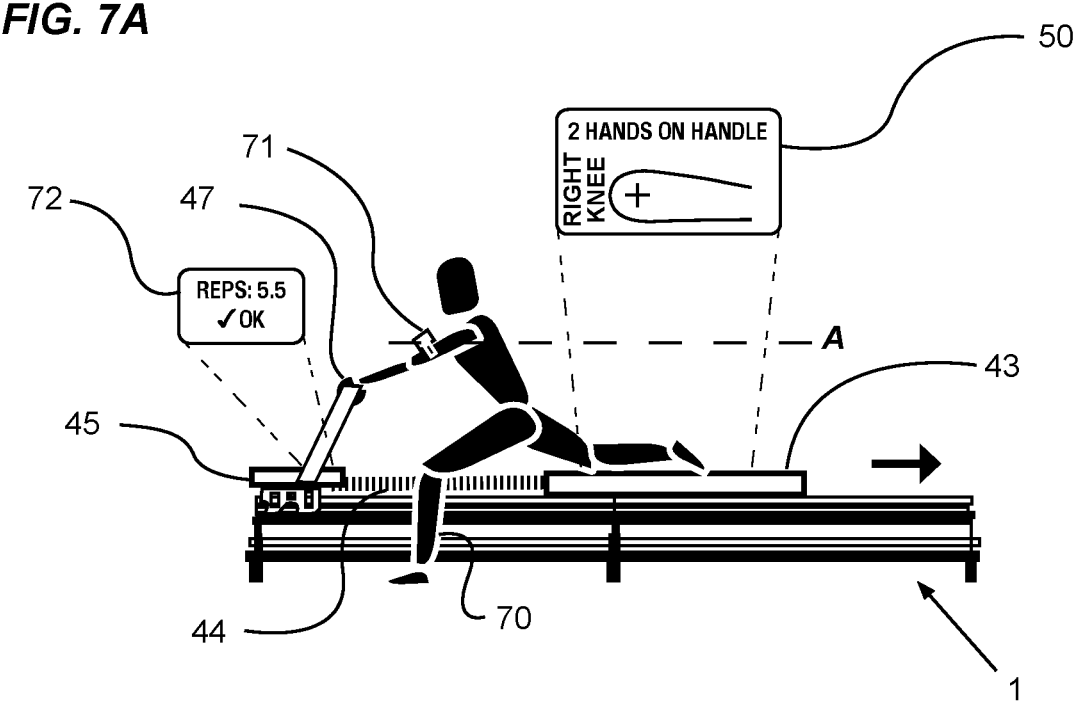
FIGS. 7A and 7B are exemplary diagrams showing a side view of two positions of an exerciser performing an exercise upon a Pilates apparatus.
Figure 7B:
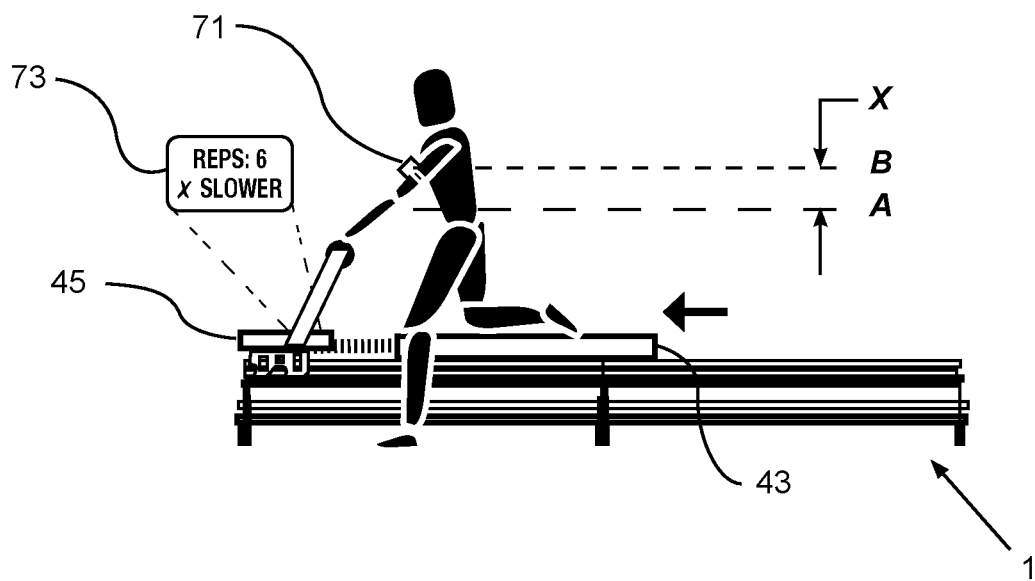

FIGS. 7A and 7B are exemplary diagrams showing a side view of two positions of an exerciser performing an exercise upon a Pilates apparatus 1. In FIG. 7A, an exerciser 70 is positioned upon a Pilates apparatus 1 with a right knee and lower leg placed upon the slidable carriage 43, a left foot placed at a stationary location upon the floor, and hands grasping a push handle 47 affixed to the stationary end of apparatus 1. By way of example, the exerciser may be wearing an activity-tracking device 71. Device 71 may be similar to wearable sensor 30.

Device 71 may be in communication with apparatus 1. For example, apparatus 1 may receive real-time physiological information from device 71, while device 71 receives alerts or notifications from apparatus 1 regarding the user's performance of the exercise (e.g., regarding position or rate of exercise). The wearable tracking device 71 is shown at a certain vertical distance above the floor, indicated by the horizontal line A.

A representative top view of an interactive display device 50 of the slidable carriage 43 is shown. The image shown in display 50 is an example of what may be displayed on carriage 43 (e.g., the display 50 on or integrated with carriage 43) before/during the user's performance of the exercise. The text and image instructions may indicate or instruct the user where to place their knee and hands in preparation of the exercise. The exerciser in the top illustration is shown with the right knee extended away from the stationary exercise platform end 45 of the apparatus 1, having used exercise force to move the slidable carriage 43 against the spring resistance means 44. In this position, the exerciser has completed five and one-half repetitions of the exercise as indicated by display 72 (which may be integrated into a different portion of apparatus 1 visible to user) or may be displayed on device 71. This display 72 may include any performance information including repetitions, heartbeat, speed, calorie count, time, or other information.

In FIG. 7B, exerciser 71 has returned to the starting position of the exercise by lowering workforce applied to the hands and right leg, thereby allowing the slidable carriage 43, in response to the spring biasing force, to return towards the stationary platform 45 end of apparatus 1. The vertical distance of the wearable tracking device 71 from the floor, being referenced by horizontal line B, may now be larger by a distance of X when compared to the mid-repetition distance A. In an embodiment, device 71, using GPS, accelerometer or other technology may determine a difference in the vertical height of device 71. This vertical distance difference information may be then be used by apparatus 1 and/or device 71 to determine when an exercise repetition is completed.

The information from the tracking device 71 may be communicated to the interactive exercise instruction system of apparatus 1 and displayed on screen 73 indicating completion of repetition number six. Additionally, if the speed at which repetition number six was completed exceeded the recommended speed for the user to maximize the benefit of this exercise, screen 73 or another device (including device 71) may be used to instruct or advice the exerciser to slow down.

In an embodiment, wearable tracking device 71 may be or include a blood pressure or heart rate monitor. Based on the profile information of a user (which may be stored with apparatus 1, or otherwise accessible by apparatus 1 over one or more networks 6), apparatus 1 may make a determination of the performance level of the exerciser based on the real-time blood pressure and heart rate information received from device 71 before/during/after the performance of an exercise.

In an embodiment, if the exerciser 70 is underperforming or not reaching their goal, the processor 2 may alert the user or change certain settings on the Pilates apparatus 1 to increase the exerciser's workload. For example, if exerciser 70 is working at 65% cardiovascular capacity when they should be working at 85% capacity for maximum exercise benefit, the processor 2 may alert the exerciser 70. Or, for example, an automatic spring tensioning device may engage additional springs 44 affixed between the slidable carriage 43 and fixed platform end 45 of the apparatus 1, thereby forcing exerciser 70 to work at a higher cardiovascular capacity to overcome the increased resistance force. Or, for example, if it is determined that the exerciser has surpassed a physiological goal, the tension may be decreased to make the exercise easier for the user.

Pilates apparatus 1 may be adjusted to perform thousands of Pilates exercises that position the exerciser in thousands of varying positions upon Pilates apparatus 1. It is understood that the apparatus 1 may be used to instruct a user how to configure or adjust an apparatus 1, position themselves, and perform any applicable exercise, as well as perform the additional functions described herein.

Although specific embodiments have been illustrated and described herein, it will be appreciated by those of ordinary skill in the art that a wide variety of alternate and/or equivalent implementations may be substituted for the specific embodiments shown and described without departing from the scope of the present disclosure. This application is intended to cover any adaptations or variations of the embodiments discussed herein.

Various aspects of specific embodiments are disclosed in the following description and related drawings. Alternate embodiments may be devised without departing from the spirit or the scope of the present disclosure. Additionally, well-known elements of exemplary embodiments will not be described in detail or will be omitted so as not to obscure relevant details. Further, to facilitate an understanding of the description, a discussion of several terms used herein follows.

The word "exemplary" is used herein to mean "serving as an example, instance, or illustration." Any embodiment described herein as "exemplary" is not necessarily to be construed as preferred or advantageous over other embodiments. All embodiments described herein are exemplary. Likewise, the term "embodiments" is not exhaustive and does not require that all embodiments include the discussed feature, advantage or mode of operation.

The word "display" as used herein describes a device used to display still or video content. Example displayed video content includes a pre-recorded instructional video, still images, multimedia, or streaming video from any number of possible sources. In an embodiment, audio files or tracks may be played alone or in conjunction with video or graphics. As used herein, "display" may refer to a display device, an interactive display device, touch screen display, or an audio speaker used in conjunction with a display device. Wherein the specification refers to a "display," the display may include video and/or audio playing capabilities. In an embodiment, a display may be used to indicate an audio-only device.

As used herein, a processor may include a device with the ability to communicate via a communication network. A processor may include, for example, a transmitter, receiver, and a signal processor for network and non-network communications. The processor may include a multi-processing system comprising multiple processors. In an embodiment, a processor may perform other functions such as providing for information retrieval from an interactive display device, processing that information, and comparing that information to a library of exerciser's body part placement or positions upon the interactive display so that the exerciser's placement or position can be computed as correct, or incorrect for the particular exercise.

As described above, network 6 may include any telecommunications network capable of transmitting data including voice data and other types of electronic data. Examples of suitable telecommunications networks for the present invention include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The present invention may communicate via a single telecommunications network or multiple telecommunications networks concurrently. Various protocols may be utilized by the electronic devices for communications such as but not limited to HTTP, SMTP, FTP and WAP (wireless Application Protocol). The present invention may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The present invention may also be utilized with online services and internet service providers.

A central communication unit may be comprised of any central communication site where communications are preferably established therewith. The central communication units may be comprised of a server computer, cloud based computer, virtual computer, home computer or other computer system capable of receiving and transmitting data via IP networks and the telecommunication networks. As can be appreciated, a modem or other communication device may be required between each of the central communication units and the corresponding telecommunication networks. The central communication unit may be comprised of any electronic system capable of receiving and transmitting information (e.g. voice data, computer data, etc.).

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

The embodiments are described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the invention will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the present invention, suitable methods and materials are described above. Thus, the present invention is not intended to be limited to the embodiments shown, but is to be accorded the widest scope consistent with the principles and features disclosed herein.

The invention claimed is:

1. A method comprising:
   receiving a selected exercise to perform on an exercise machine, the exercise machine comprising a slidable carriage having an exercise surface upon which an exerciser makes contact to perform the selected exercise on the exercise machine and a first display within the exercise surface of the slidable carriage;
   providing instructions to the exerciser on how to (a) configure the exercise machine, (b) adjust the exercise machine, or (c) be positioned on the exercise machine to perform the selected exercise;
   displaying a visual indicator on the first display indicating a location on the exercise surface where the exerciser is to make contact with the exercise surface to perform the selected exercise;
   receiving a signal indicating a contact area between the exerciser and the exercise surface;
   determining whether the contact area corresponds to the location of the visual indicator on the exercise surface, wherein a correspondence between the contact area and the location of the visual indicator indicates that the exerciser is properly positioned on the exercise surface to perform the selected exercise and wherein a lack of correspondence indicates that the exerciser is not properly positioned on the exercise surface to perform the selected exercise; and
   signaling a determination as to whether the exerciser is properly positioned on the exercise surface to perform the selected exercise.

2. The method of claim 1, wherein the first display is comprised of an interactive display or a touch screen display.

3. The method of claim 1, wherein the first display is configured to display video.

4. The method of claim 1, wherein the visual indicator is comprised of a portion of the first display illuminated.

5. The method of claim 1, further comprising:
   receiving a signal indicating a new contact area between the exerciser and the exercise surface based on a subsequent contact with the exercise surface by the exerciser;
   determining whether the new contact area corresponds to the location of the visual indicator on the exercise surface, wherein a correspondence between the new contact area and the location of the visual indicator indicates that the exerciser is properly positioned on the exercise surface to perform the selected exercise and wherein a lack of correspondence indicates that the exerciser is not properly positioned on the exercise surface to perform the selected exercise; and
   signaling a determination as to whether the exerciser is properly positioned on the exercise surface with the new contact area to perform the selected exercise.

6. The method of claim 1, further comprising providing a new instruction to the exerciser on how to correct, change, or modify an exerciser's position to properly perform the selected exercise.

7. The method of claim 1, wherein the step of signaling comprises signaling via a second display associated with the exercise machine whether the exerciser is properly positioned on the exercise surface to perform the selected exercise.

8. The method of claim 1, wherein the step of signaling comprises providing a visual signal, an audio signal, or a tactile signal.

9. The method of claim 1, further comprising:
   receiving a physiological measurement indicating whether the exerciser has reached a goal during a performance of the selected exercise;
   increasing a tension of the exercise machine if the exerciser has not reached the goal; and
   decreasing the tension of the exercise machine if the exerciser has reached the goal.

10. A system comprising a processor and a non-transitory memory, wherein the processor is configured to:
    receive a selected exercise to perform on an exercise machine, the exercise machine comprising a slidable carriage having an exercise surface upon which an exerciser makes contact to perform the selected exercise on the exercise machine and a first display within the exercise surface of the slidable carriage;

provide instructions to the exerciser on how to (a) configure the exercise machine, (b) adjust the exercise machine, or (c) be positioned on the exercise machine to perform the selected exercise;

display a visual indicator on the first display indicating a location on the exercise surface where the exerciser is to make contact with the exercise surface to perform the selected exercise;

receive a signal indicating a contact area between the exerciser and the exercise surface;

determine whether the contact area corresponds to the location of the visual indicator on the exercise surface, wherein a correspondence between the contact area and the location of the visual indicator indicate that the exerciser is properly positioned on the exercise surface to perform the selected exercise, and wherein a lack of correspondence indicates that the exerciser is not properly positioned on the exercise surface to perform the selected exercise; and signal a determination as to whether the exerciser is properly positioned on the exercise surface to perform the selected exercise.

11. The system of claim 10, wherein the first display is comprised of an interactive display or a touch screen display.

12. The system of claim 10, wherein the first display is configured to display video.

13. The system of claim 10, wherein the visual indicator is comprised of a portion of the first display illuminated.

14. The system of claim 10, wherein the processor is configured to:
receive a signal indicating a new contact area between the exerciser and the exercise surface based on a subsequent contact with the exercise surface by the exerciser;
determine whether the new contact area corresponds to the location of the visual indicator on the exercise surface, wherein a correspondence between the new contact area and the location of the visual indicator indicates that the exerciser is properly positioned on the exercise surface to perform the selected exercise and wherein a lack of correspondence indicates that the exerciser is not properly positioned on the exercise surface to perform the selected exercise; and
signal the determination as to whether the exerciser is properly positioned on the exercise surface with the new contact area to perform the selected exercise.

15. The system of claim 10, wherein the processor is configured to provide a new instruction to the exerciser on how to correct, change or modify an exerciser's position to properly perform the selected exercise.

16. The system of claim 10, wherein the processor is configured to signal via a second display associated with the exercise machine whether the exerciser is properly positioned on the exercise surface to perform the selected exercise.

17. The system of claim 10, the processor configured to:
receive a physiological measurement indicating whether the exerciser has reached a goal during a performance of the selected exercise;
increase a tension of the exercise machine if the exerciser has not reached the goal; and
decrease the tension of the exercise machine if the exerciser has reached the goal.

18. An apparatus comprising a non-transitory computer readable storage medium having a plurality of instructions stored thereon that, when executed by one or more processors of the apparatus, cause the one or more processors to:
receive a selected exercise to perform on an exercise machine, the exercise machine comprising a slidable carriage having an exercise surface upon which an exerciser makes contact to perform the selected exercise on the exercise machine and a first display within the exercise surface of the slidable carriage;
provide instructions to the exerciser on how to (a) configure the exercise machine, (b) adjust the exercise machine, or (c) be positioned on the exercise machine to perform the selected exercise;
display a visual indicator on the first display indicating a location on the exercise surface where the exerciser is to make contact with the exercise surface to perform the selected exercise;
receive a signal indicating a contact area between the exerciser and the exercise surface;
determine whether the contact area corresponds to the location of the visual indicator on the exercise surface, wherein a correspondence between the contact area and the location of the visual indicator indicate that the exerciser is properly positioned on the exercise surface to perform the selected exercise, and wherein a lack of correspondence indicates that the exerciser is not properly positioned on the exercise surface to perform the selected exercise; and
signal a determination as to whether the exerciser is properly positioned on the exercise surface to perform the selected exercise.

19. A method comprising:
receiving a selected exercise to perform on an exercise machine, the exercise machine comprising a slidable carriage having an exercise surface upon which an exerciser makes contact to perform the selected exercise on the exercise machine and a first display within the exercise surface of the slidable carriage;
displaying a visual indicator on the first display indicating a location on the exercise surface where the exerciser is to make contact with the exercise surface to perform the selected exercise;
receiving a signal indicating a contact area between the exerciser and the exercise surface;
determining whether the contact area corresponds to the location of the visual indicator on the exercise surface, wherein a correspondence between the contact area and the location of the visual indictor indicates that the exerciser is properly positioned on the exercise surface to perform the selected exercise, and wherein a lack of correspondence indicates that the exerciser is not properly positioned on the exercise surface to perform the selected exercise;
signaling a determination as to whether the exerciser is properly positioned on the exercise surface to perform the selected exercise;
receiving a physiological measurement indicating whether the exerciser has not reached a goal during a performance of the selected exercise; and
increasing a tension of the exercise machine if the exerciser has not reached the goal.

20. The method of claim 19, further comprising:
receiving a signal indicating a new contact area between the exerciser and the exercise surface based on a subsequent contact with the exercise surface by the exerciser;
determining whether the new contact area corresponds to the location of the visual indicator on the exercise surface, wherein a correspondence between the new contact area and the location of the visual indicator indicates that the exerciser is properly positioned on the exercise surface to perform the selected exercise and wherein a lack of correspondence indicates that the exerciser is not properly positioned on the exercise surface to perform the selected exercise; and signaling a determination as to whether the exerciser is properly positioned on the exercise surface with the new contact area to perform the selected exercise.

* * * * *